May 4, 1948.  J. T. BELL  2,440,923

WINDSHIELD DEFROSTER

Filed April 24, 1944

INVENTOR.
JOSEPH T. BELL
BY
Kwis Hudson Boughton & Williams
ATTORNEYS

Patented May 4, 1948

2,440,923

UNITED STATES PATENT OFFICE 2,440,923

WINDSHIELD DEFROSTER

Joseph T. Bell, Alliance, Ohio

Application April 24, 1944, Serial No. 532,395

1 Claim. (Cl. 219—19)

This invention relates to a defroster adapted to be applied to the windshield wipers of automobiles and other vehicles.

An object of the invention is to provide a defroster which can be readily constructed and securely and easily fastened to a windshield wiper arm of standard construction.

An additional object is to provide an effective defroster unit having concentric tubes the inner tube supporting a heating wire or coil, the whole being so arranged that the defroster has long life and is not likely to readily get out of order.

The invention may be further briefly summarized as consisting in certain details of construction and combinations and arrangements of parts which will be described in the specification and set forth in the appended claim.

Figure 1:
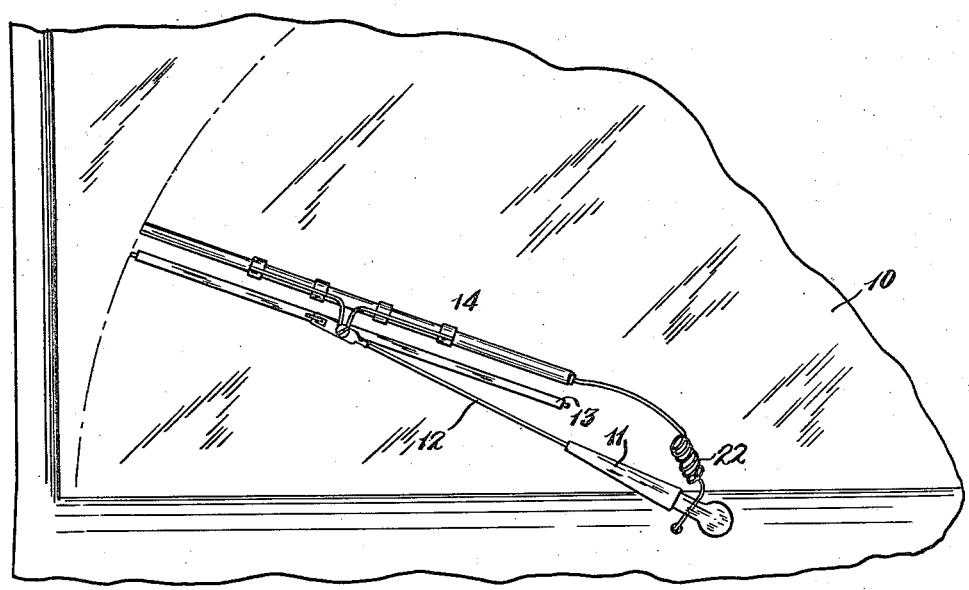
Figure 2:
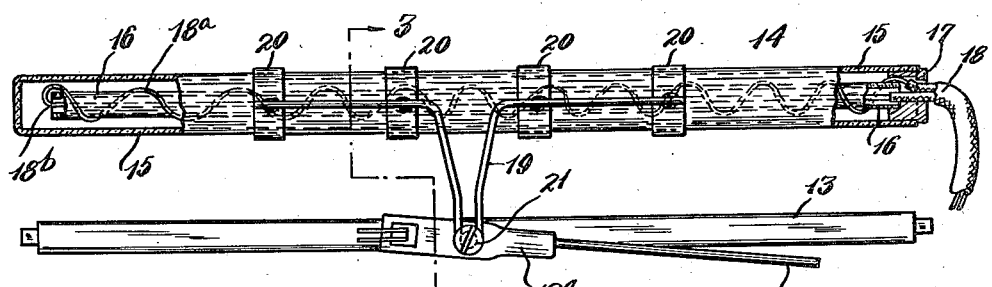
Figure 3:
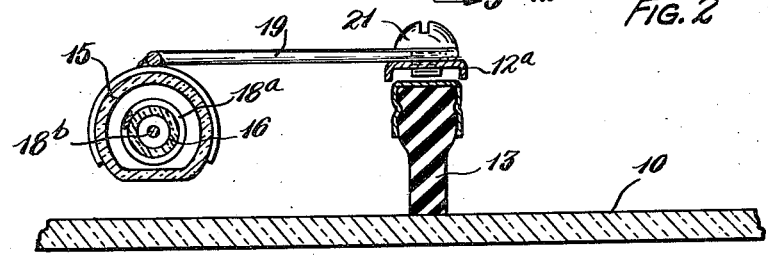

In the accompanying sheet of drawings illustrating an embodiment of my invention, Fig. 1 shows the device of my invention applied in position on the windshield of an automobile;

Fig. 2 is a view partly in section and partly in elevation showing the windshield wiper and defroster detached, this view being shown on a slightly enlarged scale; and Fig. 3 is a sectional view substantially along the line 3—3 of Fig. 2 on a still further enlarged scale, the wiper being associated with the windshield.

Referring now to the drawings, 10 represents the windshield of an automobile but the device of my invention can be applied to other forms of vehicles such as street cars and the like. Attached to the lower frame member of the windshield 10 is a standard form of windshield wiper 11 consisting of a wiper arm 12 and a wiper 13 which is mounted in the usual fashion at the outer end of the wiper arm 12.

One of the features of the invention is the construction or manner of forming the defroster unit which is shown at 14. This unit 14 includes an outer tube 15 which may be formed of glass or suitable plastic preferably transparent, and, as here shown, the tube 15 is flattened on the side next to the windshield 10 to provide a substantially flat heat radiating surface parallel to the windshield. Supported centrally in the tube 15 is an inner tube 16 which is also formed of glass or suitable plastic preferably transparent and which supports the wires of the electric heating agency. The tube 16 is supported from the outer tube 15 by having one end secured in a cap 17 fitted in the end of the outer tube 15. The heating wires are shown at 18. One of these wires 18a, which is termed the "hot" wire, is coiled around the outside of the inner tube 16 and at the outer end of the tube 16 this wire is extended through the tube 16 as shown at 18b and constitutes the ground return lead so that the tube 16 acts as an insulator for the hot wire coil and the return lead.

A second feature of the invention is the manner in which the defroster 14 is applied to and supported from the windshield wiper arm 12 and held out of contact with but closely adjacent the windshield. The defroster is secured to the head or upper end 12a of the windshield wiper arm 12 by a wire 19 which is secured as by soldering to a series of clips 20 which fit tightly upon the outer tube 15 of the defroster. These clips 20 are held in spaced relation with respect to the tube 15 by the wire 19. In this instance, four of these clips are employed, but a greater or lesser number may be utilized if found desirable or necessary. Straight portions at opposite ends of the wire are soldered to the clips 20 and the middle portion of the wire extends laterally and is seated under the head of a screw 21 having threaded engagement with the head 12a of the windshield wiper arm, and when the screw 21 is tightened, the defroster is securely held to the wiper arm.

The wires 18 will pass to a switch not shown which will be connected in the battery circuit of the vehicle, and to prevent the wires from interfering with the movement of the defroster and windshield wiper, I prefer to provide a coil 22 which is arranged at a suitable point between the switch and the lower end of the defroster.

Ordinarily, the windshield wiper alone is relied upon, in which event the switch will be open. When, however, it is desired to use the defroster, the switch will be closed and the heat created by the hot wire 18a will pass through the outer tube 15 onto the windshield in the vicinity of the wiper blade. By making the outer tube flat on the side next to the windshield the radiation of heat onto the windshield is very materially increased over what it would be if the outer tube were round. Furthermore, the tubes 15 and 16 being transparent, the defroster will not materially obstruct the vision of the car driver and also, for the same reason, is not particularly conspicuous.

Thus it will be seen that the defroster is readily and easily constructed particularly since it is only necessary to wind the hot wire 18a around the outside of the inner tube 16, extend the return wire through the tube, and insert the inner tube 16 into the outer tube 15 and support it in position by means of the cap 17. The defroster is completed by simply applying the clips 20 to the outer tube 15. Likewise, the defroster can be readily attached to or removed from the windshield wiper by manipulating the screw 21.

From the foregoing it will be seen that the objects stated at the beginning of the specification are very effectively attained, and while I have described the preferred embodiment of the invention, I do not desire to be confined to the precise details shown and described but aim in my claim to cover all modifications which do not involve a departure from the spirit and the scope of the invention.

Having thus described my invention, I claim:

In combination with a windshield wiper, a defroster comprising a pair of inner and outer tubes, a heating wire associated with the inner tube, and means for securing said defroster to the wiper arm comprising clips passing about the outer tube, a wire having end portions secured to the clips and having a middle portion extending to the wiper arm, and a screw for attaching the outer part of said middle portion to the wiper arm.

JOSEPH T. BELL.

REFERENCES CITED

The following references are of record in the file of this patent:

UNITED STATES PATENTS

| Number | Name | Date |
|---|---|---|
| 1,459,307 | Laise et al. | June 19, 1923 |
| 1,729,636 | Vermette | Oct. 1, 1929 |
| 1,739,411 | Murphy | Dec. 10, 1929 |
| 1,768,727 | Yonan | July 1, 1930 |
| 1,775,231 | Waggoner et al. | Sept. 9, 1930 |
| 2,271,977 | Hjelmgren | Feb. 3, 1942 |